United States Patent
Harverson (10) Patent No.: US 8,248,977 B2
(45) Date of Patent: Aug. 21, 2012

(54) ROUTING OF DOWNLINK CHANNELS IN A COMMUNICATIONS SATELLITE

(75) Inventor: Michael Harverson, Potton (GB)

(73) Assignee: Astrium Limited, Herfordshire (GB)

( * ) Notice: Subject to any disclaimer, the term of this patent is extended or adjusted under 35 U.S.C. 154(b) by 494 days.

(21) Appl. No.: 12/303,620

(22) PCT Filed: Apr. 9, 2008

(86) PCT No.: PCT/GB2008/050247
§ 371 (c)(1),
(2), (4) Date: Dec. 5, 2008

(87) PCT Pub. No.: WO2008/125876
PCT Pub. Date: Oct. 23, 2008

(65) Prior Publication Data
US 2010/0226307 A1 Sep. 9, 2010

(30) Foreign Application Priority Data
Apr. 16, 2007 (EP) .................................... 07270020
Apr. 16, 2007 (GB) .................................... 0707173.1

(51) Int. Cl.
*H04B 7/00* (2006.01)
*H04B 7/185* (2006.01)
*H04B 1/38* (2006.01)
*H04W 4/00* (2009.01)
*H04J 3/04* (2006.01)

(52) U.S. Cl. ..................... 370/310.2; 370/316; 370/328; 370/534; 375/219; 455/12.1; 455/427

(58) Field of Classification Search .......... 370/310–350, 370/464–465, 497, 532–535, 537–541; 375/146, 375/219–220, 222, 260, 328; 455/3.01–3.04, 455/12.1–13.2, 427
See application file for complete search history.

(56) References Cited

U.S. PATENT DOCUMENTS

| | | | |
|---|---|---|---|
| 4,029,902 A | 6/1977 | Bell, Jr. et al. | |
| 4,905,239 A * | 2/1990 | Lockwood et al. | 370/497 |
| 5,428,814 A * | 6/1995 | Mort et al. | 455/12.1 |
| 5,956,620 A * | 9/1999 | Lazaris-Brunner et al. | 455/12.1 |
| 5,963,845 A | 10/1999 | Floury et al. | |
| 6,157,811 A | 12/2000 | Dent | |
| 6,266,329 B1 * | 7/2001 | Lazaris-Brunner et al. | 370/316 |
| 6,275,479 B1 * | 8/2001 | Snell et al. | 370/318 |
| 6,341,213 B1 * | 1/2002 | Wu | 455/12.1 |
| 6,442,148 B1 * | 8/2002 | Adams et al. | 370/325 |

(Continued)

OTHER PUBLICATIONS

International Preliminary Report on Patentability for International Application No. PCT/GB2008/050247 issued Oct. 20, 2009.
United Kingdom Search Report for Great Britain Application No. GB0707173 dated Aug. 7, 2007.

(Continued)

*Primary Examiner* — Tri H Phan
(74) *Attorney, Agent, or Firm* — Pearl Cohen Zedek Latzer, LLP (57) ABSTRACT

For selectively routing downlink frequency channels to downlink beams of a communications satellite, the inherent routing functionality of a normal bandwidth multiport amplifier (MPA) is exploited in conjunction with the grouped channel filter characteristics of an output multiplexer (OMUX). In this arrangement the guard bands inherent in the OMUX mitigate the poor inter-port isolation inherent in the MPA so that two low performance elements in combination can be used to achieve an improved performance at system level.

16 Claims, 6 Drawing Sheets

Beam A

Beam B

U.S. PATENT DOCUMENTS

| | | |
|---|---|---|
| 6,973,287 B2 * | 12/2005 | Franzen et al. .............. 455/12.1 |
| 7,925,208 B2 * | 4/2011 | Sarraf et al. ................ 455/12.1 |
| 8,098,612 B2 * | 1/2012 | Chang ........................... 370/316 |
| 2004/0141474 A1 | 7/2004 | Chen |
| 2005/0227617 A1 | 10/2005 | Hoffman et al. |

OTHER PUBLICATIONS

European Search Report for European Application No. EP 07 27 0020 dated Aug. 29, 2007.

International Search Report for International Application No. PCT/GB2008/050247 mailed on Sep. 9, 2008.

* cited by examiner

ROUTING OF DOWNLINK CHANNELS IN A COMMUNICATIONS SATELLITE

CROSS-REFERENCE TO RELATED APPLICATIONS

This application is a National Phase Application of PCT International Application No. PCT/GB2008/050247, International Filing date of Apr. 9, 2008, claiming priority of GB Patent Application, 0707173.1, filed Apr. 16, 2008 and EP Patent Application 07270020.6, filed Apr. 16, 2008; which are hereby incorporated by reference in their entirety.

FIELD OF THE INVENTION

The present invention relates to routing of downlink channels in communications satellites, including in particular a means of selectively directing downlink channels to downlink beams.

BACKGROUND ART

Conventional communications satellites receive and amplify a number of signals from ground based transmitters and direct the amplified signals to receivers in specific geographical locations. This function is commonly referred to as a transparent radio.

Frequency repeater. Transparent repeaters do not demodulate the signals but merely amplify and redirect them. Those carried on satellites are used for commercial applications such as TV broadcast and two-way point to point data links. Signals are sent to the satellite in one frequency band (the uplink) and are redirected to user terminals in a different band (the downlink).

Figure 1:
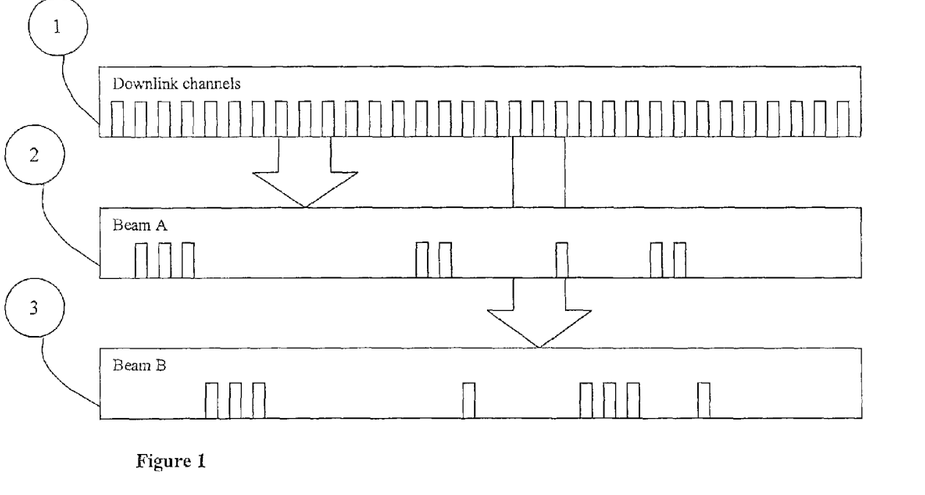
FIGS. 1 to 4 show prior art arrangements for selectively directing downlink channels to downlink beams.

A typical uplink and downlink might comprise several channels from a total up to 100 within a 2 GHz band. The uplink channels are amplified, changed in frequency to fit within the downlink band and directed to a particular geographical location via a high gain antenna. A simplified example of this is shown schematically in FIG. 1. The downlink band 1 is shown as comprising only 32 channels with exaggerated guard band spacing for clarity. Each of the channels shown in this example could accommodate several narrowband channels in practice. Each of the downlink beams 2, 3 is shown as selecting 8 discrete channels from the downlink band.

Modern communications satellites are required to support a variety of business models, which may change over time. Satellite operators require their costly satellite infrastructure to be operationally flexible in terms of channel to beam connectivity, which implies the need for complex RF switch and filter networks that can be reconfigured easily.

These networks have been implemented typically using electromechanical switches but in the low power signal section of the satellite repeater they may now be realised using wide-band solid state switch matrices or digital signal processing techniques. Such input networks are able to determine the correspondence between uplink and downlink channels (frequency flexibility) but the amplified signals then have to be assembled in groups that can be carried within a particular antenna beam (channel to beam flexibility).

Figure 2:
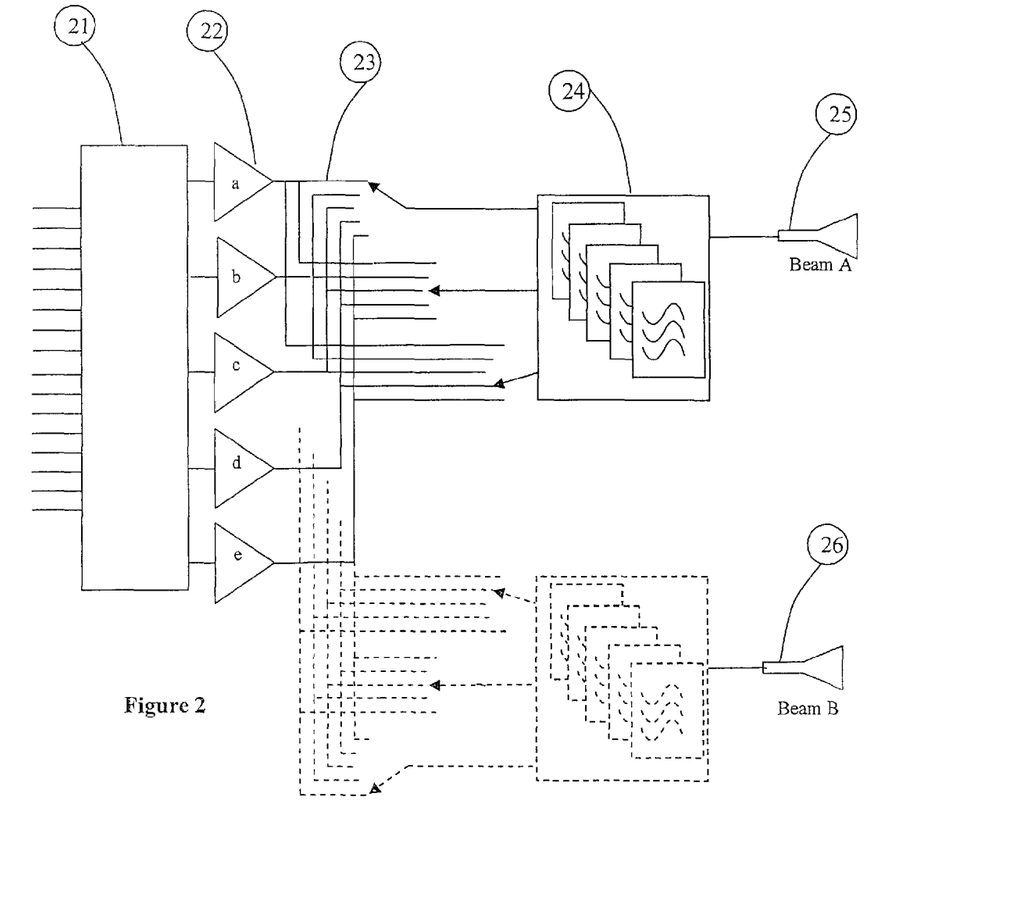

In a conventional repeater, as shown in FIG. 2, low power input filters ensure that each amplifier carries typically just one channel. All channels are then amplified to a similar power level and conveniently, by restricting the amplifiers to a narrow band of frequencies, the amplifier power outputs can be optimised. The principle of operation for a typical repeater scheme with a degree of channel to beam flexibility is shown in FIG. 2. For clarity this is limited to the selection of any three outputs from any five amplifiers. In this scheme an input signal network or processor 21 containing low power input filters directs each of the selected downlink channels to an amplifier 22. High power microwave selector switches 23 then direct the selected channels, via a power combiner 24, to the antenna feed 25 that corresponds to the desired geographical coverage area. A second beam 26 requires a similar switch and filter arrangement and this would be repeated for each separate beam required. The combiner achieves high power transfer efficiency by incorporating filters that correspond to the channels that may be selected. It is clear from this architecture that for satellites that may be required to operate with many possible combinations of channels and coverage areas, a large number of high power selector switches and output filters is required. This adds mass and cost to the satellite but there is the advantage that such a scheme may obviate the need for additional switches to accommodate equipment failures.

Figure 3:
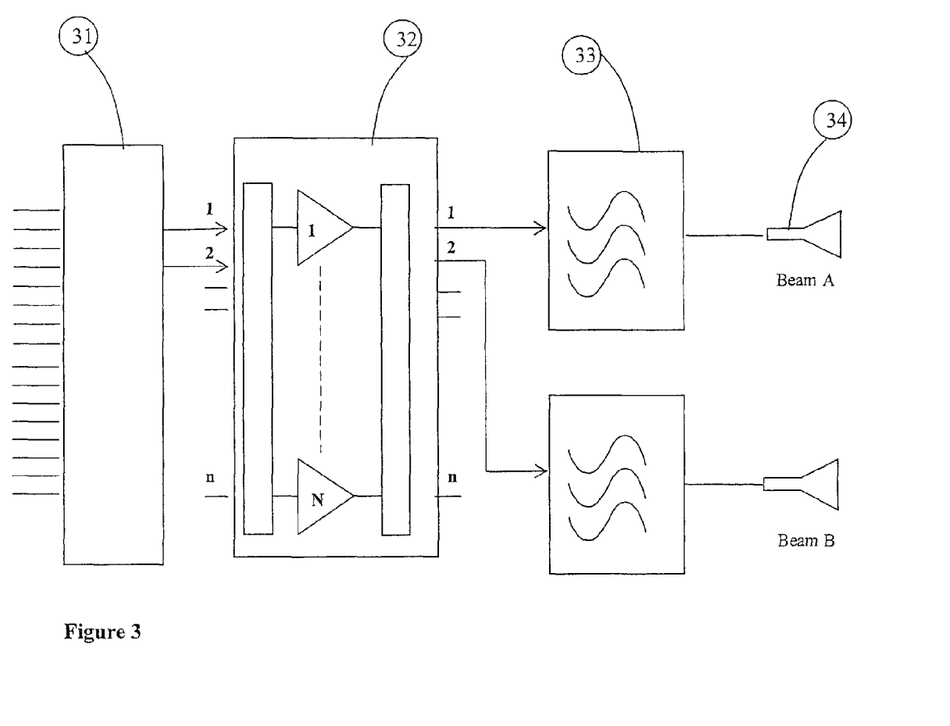

The complexity of combining the outputs from several different amplifiers can be avoided if a Wide-band Multi-Port Amplifier (WMPA) is used. A WMPA comprises a set of wide-band amplifiers that are connected via microwave hybrids. This arrangement ensures that signals presented at a specific input port pass equally through all of the amplifiers and the combined outputs are routed to the corresponding output port. The principle of operation for a two beam case is shown in FIG. 3. An input signal network or processor 31 directs a number (n) of the selected downlink channels to a WMPA 32. The WMPA comprises a number (N) of amplifiers that could operate over the whole of the downlink band (typically 2 GHz wide), where the number N is not necessarily equal to n. This scheme avoids the need for high power switch networks because the channels required for a specific coverage or beam are combined in the low power input section and map across to the corresponding amplifier output port. A 2 GHz band-pass filter 33 ensures any "out of band" products are not carried through to the feed 34. Advantageously, this arrangement also confers a high degree of tolerance to individual amplifier failures when the number of amplifiers is large. Principal disadvantages of MPAs, when operating over a wide bandwidth, are the difficulty of ensuring adequate inter-port isolation (the cross-talk problem) and achieving high overall amplifier efficiency (RF output vs. energy input).

Figure 4:
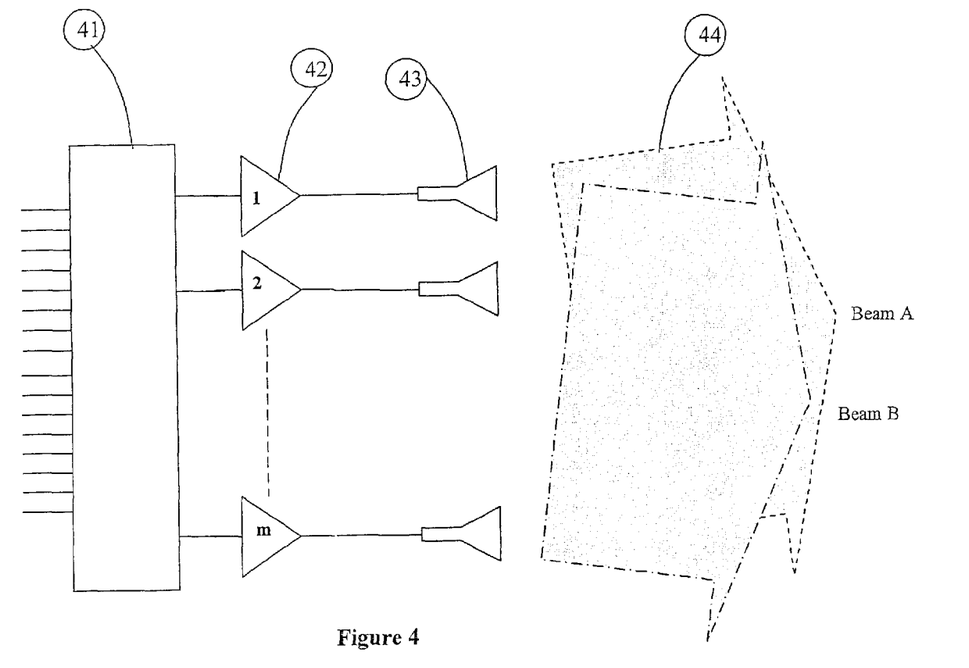

An alternative method of avoiding the complexity of combining the outputs from several different amplifiers is to perform the power combination in free space. This is achieved by using a multi element phased array or active antenna. In this arrangement each antenna element is driven by a dedicated low power wide-band amplifier and all of the amplifiers carry all of the downlink signals. The principle of operation is shown in FIG. 4.

The input signal processor 41 determines the relative amplitude and phase of the signals presented to each of the amplifiers 42 and their dedicated antenna feeds 43. The amplitude and phase relationships are determined such that the selected downlink channels appear in the appropriate antenna beam 44.

Advantageously, this arrangement also confers a high degree of tolerance to individual amplifier failures, since the number of antenna elements and hence the number of amplifiers is typically large. Unfortunately, this solution simply transfers the complexity problem to the signal processor, which for some applications may not be practical to build using current technology.

SUMMARY OF THE INVENTION

This invention exploits the inherent routing functionality of a multiport amplifier (MPA) in conjunction with the grouped channel filter characteristics of an output multiplexer (OMUX). In this arrangement the guard bands inherent in the OMUX mitigate the poor inter-port isolation inherent in the MPA. In other words, two low performance elements in combination can be used to achieve an improved performance at system level.

An MPA is a well-known power amplifier device used for satellite communications, which may operate at microwave frequencies above 1 GHZ, and covering E, L bands with frequencies in the range of 1-2 GHz, Ku and Ka bands with frequencies in the region 12-40 GHz, etc. An MPA includes a number N of similar amplifier units (TWT or solid state) in parallel, each having a power P, so that each input signal is amplified by each amplifier, to increase the power of each output signal by a factor N, to P×N. N input ports and N output ports are provided, so that an input signal on one input port is routed to the corresponding output port. The input ports are connected to the amplifier units by a low power input network (INET) that may be implemented in any convenient transmission line technology that is appropriate to the circumstances, e.g. microstrip, stripline, coaxial cable, or waveguide, and the output ports are connected to the amplifier units by a high power output network (ONET) that is implemented typically using low loss transmission line technology. The ONET is mathematically a reciprocal of the INET, so that a signal presented to the nth input is directed to the nth output. Each network comprises an array of signal dividing waveguide devices. Hybrid devices are normally used for signal division, because they have convenient gain and phase shift properties. A hybrid is a four port signal dividing device comprising two inputs and two outputs, with selective 90° phase shifts; this phase difference may be exploited to improve the isolation characteristics of the networks. However other hybrids and other signal splitting devices may be used which may have 180° phase difference.

For the purposes of the present specification, a multiport amplifier is defined as comprising a plurality of microwave power amplifier units, a plurality of input ports and a plurality of output ports, the input ports and the output ports being connected to said amplifier units by signal dividing networks, so that an input signal at any input port is amplified, equally in normal or typical circumstances, by all amplifier units, and then recombined into an output signal at an output port: such multiport amplifier will be referred to as a "multiport amplifier as defined herein".

An output multiplexer (OMUX) is a well-known device for multiplexing a number of high power signals to a common output port. An output multiplexer (OMUX) commonly has a number of input ports coupled through low loss transmission line paths, for example hollow waveguides, to an output path and output port, each input path including a band pass filter of predefined characteristics, with guard bands between adjacent pass bands. OMUXes are manufactured for example by Tesat-Spacecom GmbH & Co. KG, and are described at: http://www.electronicnote.com/site/PDF/Tesat%20Passive%20Components-2004.pdf For the purposes of the present specification an output multiplexer is defined as comprising a plurality of input ports coupled via transmission lines to an output port, and each input port being coupled to the output port via a respective band pass filter, each said band pass filter having a predetermined pass bandwidth with guard bands between the pass band and adjacent pass bands; such output multiplexer will be referred to as an "output multiplexer as defined herein".

In a first aspect, the invention provides apparatus for selectively directing downlink channels to downlink beams of a communications satellite, comprising:
 at least one multiport amplifier as defined herein,
 at least one output multiplexer as defined herein,
 and the input ports of said one output multiplexer being coupled to the output ports of said one multiport amplifier wherein said guard bands are dimensioned to have a predetermined width in frequency so as to compensate at least partially for cross-talk characteristics of said one multiport amplifier.

In a further aspect, the present invention provides a method of selectively directing downlink channels to downlink beams of a communications satellite, including:
 providing at least one multiport amplifier, the or each multiport amplifier being as defined herein
 providing at least one output multiplexer, the or each output multiplexer being as defined herein,
 wherein the downlink channels comprise a plurality of frequency channels spaced across a downlink signal bandwidth, and selectively directing the frequency channels to input ports of said one multiport amplifier, and selectively coupling the input ports of said one output multiplexer to the output ports of said one multiport amplifier, wherein said guard bands are dimensioned to be of a predetermined width in frequency so as to compensate at least partially for cross-talk characteristics of said one multiport amplifier.

In accordance with the invention, each output signal from an output port of the multiport amplifier (MPA) is selected to have a frequency bandwidth to fit within the bandwidth of a band pass filter of the output multiplexer (OMUX). The guard bands of the OMUX improve the isolation of the MPA output signals. Since the guard bands and pass bands of the OMUX may be predefined to have any desired value, the isolation and reduction of crosstalk of the MPA output signals may be improved to any desired degree. Whereas in practice an MPA can be expected to achieve about 20 dB isolation between outputs, without employing special compensation techniques, the preferred isolation would be about 30 dB. In accordance with this invention the OMUX may therefore only be required to achieve a further 10 dB of isolation, which is readily achievable with relatively low insertion loss, particularly if the guard bands are selected to be greater than 50% of the pass band. An OMUX may in principle provide a far greater degree of isolation than this, but where a lesser degree of isolation is required, flexibility is permitted in design parameters to permit other parameters such as loss to be optimised.

Increasing the width of the guard bands of the OMUX brings the concomitant disadvantage that the bandwidth between output signals of the MPA, which are adjacent in frequency, increase. Since it is a normal configuration for communications satellites that the output channels for the downlink are of the same bandwidth and are regularly spaced across the total signal bandwidth (for example in FIG. 1, there may be 100 channels spaced across a total bandwidth of 2 GHz for the Ka band) some of the output channels may fall within the guardbands and therefore cannot be used.

In a preferred arrangement therefore, at least two output multiplexers (OMUXes) have their passbands interleaved, with a guard band being at least the width of a pass band, so that there is no overlapping of the pass bands. Each OMUX may be wide band in nature, so as to cover the whole spectrum of input signals, which may be as large as 2 or more GHz for higher bands such as Ka. In this way, frequency channels from the MPA that are adjacent in frequency may be routed to different OMUXes, for further maintaining the availability of the frequency channels, and at the same time maintaining the increase in isolation characteristics. As many OMUXes as desired may be provided with interleaved passbands: the more OMUXes, the wider the guardbands within each OMUX.

A further issue may then arise in that in a common configuration of a communications satellite, each OMUX provides the feed signal to a separate feed horn for generating a respective spot beam, at least in a single beam per feed configuration for an AFR antenna. This may mean that some frequency channels cannot be routed to a particular geographic area. In a further development therefore, the outputs from first and second feed horns that are fed by first and second OMUXes, are directed so as to form a combined spot beam, which may have all available downlink frequency channels.

The bandwidth of said one MPA will be as wide as necessary in order to accommodate the anticipated bandwidth of input downlink channels. First and second multipart amplifiers (MPAs) may be provided, with a first MPA covering a lower half of the output signal spectrum (say 1 GHz), and the second MPA covering the upper half of the spectrum. A larger number of MPAs may be provided, each having a correspondingly smaller part of the input spectrum—the smaller the signal spectrum, in general the better the characteristics of the MPA, in particular isolation characteristics. Each output signal of an MPA may include a plurality of frequency channels, depending on the application: for example a high bandwidth video signal may occupy a number of adjacent frequency bands. The wider the bandwidth of an MPA output signal, the wider the bandwidth of the passband of the respective OMUX input.

BRIEF DESCRIPTION OF THE DRAWINGS

A preferred embodiment of the invention will now be described with reference to the accompanying drawings, wherein.

DESCRIPTION OF THE PREFERRED EMBODIMENT

This invention exploits the inherent routing functionality of an MPA in conjunction with the grouped channel filter characteristics of an OMUX. In this arrangement the guard bands inherent in the OMUX mitigate the poor inter-port isolation inherent in the MPA. In other words, two low performance elements in combination can be used to achieve an improved performance at system level.

High power output multiplexer (OMUX) filters cannot be made to be contiguous across the downlink band and in practice it is necessary to allow a significant guard band between the individual filters. The relationship between amplifier and filter bandwidths for this particular example is shown in FIG. 6, where two interleaved OMUX (notionally "odd" and "even") cover the whole of the downlink band.

Figure 5:
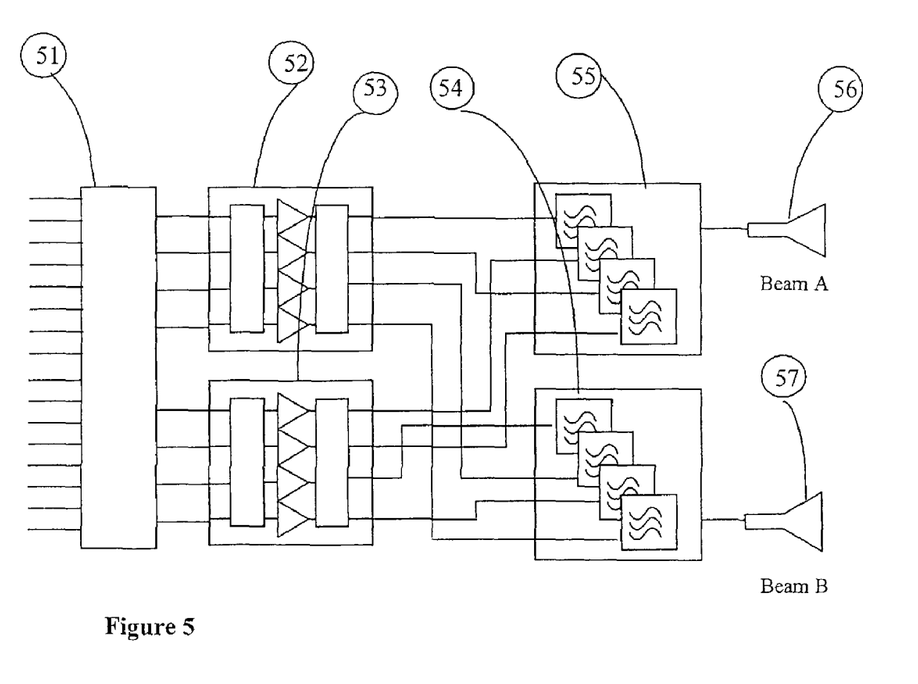
FIG. 5 is a schematic block diagram of the structure of a preferred embodiment of the present invention.

An embodiment of this invention is shown in FIG. 5. An input signal network or processor 51 directs each of the selected downlink channels to one of the input ports of two four port MPAs 52, 53, each being as described and defined herein. The outputs are then routed to two interleaved OMUXes 54, 55, each as described and defined herein. The output port of each OMUX is coupled to respective separate antenna beam feeds 56, 57 of a multi-beam antenna, e.g. AFR. For clarity, only eight channel amplification paths are shown and additional switching to compensate for equipment failures has been omitted.

Figure 6:
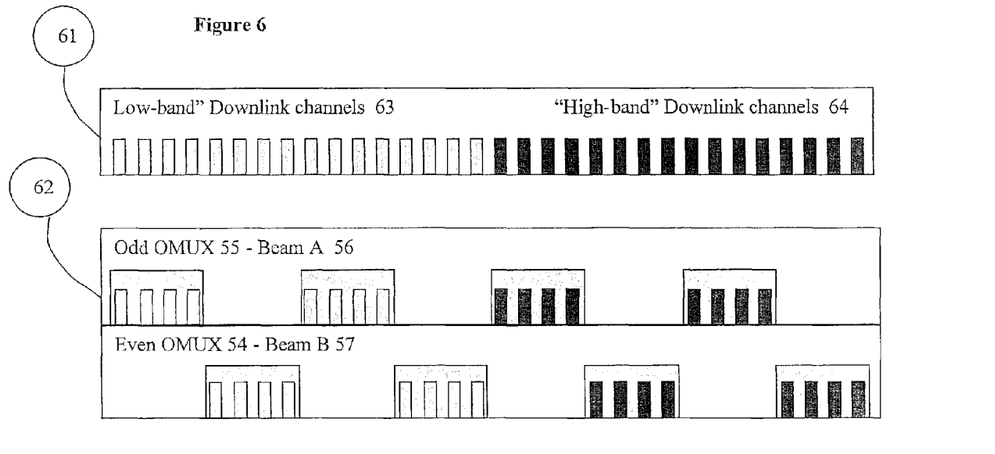
FIG. 6 is a band plan showing the allocation of downlink channels between the MPAs and OMUXes of FIG. 5.

The routing flexibility achieved in this example of two 4-port MPAs and OMUXs is shown schematically for a nominal 2 GHz-downlink band in the band plans of FIG. 6. As shown in plan 61, MPA 52 covers the lower half 63 of the downlink band, and the MPA 53 covers the upper half 64 of the downlink band. Thus MPA 52 amplifies the channels in the lower half of the band (16 in this example), and MPA 53 the upper half. As shown in plan 62, each OMUX 54, 55 comprises four 250 MHz wide filters, with 250 MHz wide guard bands so that each OMUX extends across the whole 2 GHz band. When the OMUXes are interleaved as shown in plan 62, they cover the whole of the downlink band. The signals at the output ports of the MPAs are selectively directed to the input ports of the OMUXes, so that each passband of an OMUX accepts an output of an MPA, which corresponds in frequency and which in this example comprises four downlink channels that are adjacent in frequency.

The cross-strapping connection between MPAs and OMUXs permits channels across the downlink band to be routed to either beam, with no output switches required. Advantageously, signals on each MPA output port differ widely in frequency so that the corresponding OMUX filter can reject the unwanted "crosstalk" components.

It is clear that there are limitations to the channel to beam routing flexibility achievable with this invention, principally because the OMUX filters cannot be made to be contiguous across the band and therefore the signals presented to feeds 56, 57 will be either "odd" or "even". It is possible to combine the feeds 56, 57 into a single beam, for example by using a dual feed antenna To achieve high efficiency it may be necessary to further restrict the bandwidth of the MPAs and some high power selector switches may be required to accommodate normal through-life equipment failures. Moreover, when the number of OMUX filter input ports exceeds the number of MPA output ports, high power selectivity switches would be required to maintain full channel plan frequency flexibility. However, the complexity of any such switch arrangement would be far below that required in an equivalent conventional arrangement with the general architecture of FIG. 2.

Furthermore, flexibility can be maintained in the case of MPA failures if several MPAs are employed with overlapping frequency bands. Advantageously, this invention minimises the need for additional selector switches as the size of a particular payload and degree of flexibility is increased. In the limit, this invention achieves a degree of flexibility that approaches that of the ideal MPA solution described in FIG. 3. This is not the case for other schemes that employ commonly available satellite payload building blocks.

Features of the Invention are as Follows:

MPAs coupled through wide bandwidth OMUX filters, to confer operational selectivity of a particular set of amplified downlink channels from a larger set of channels with few or no selectivity constraints.

Independent routing of a selected downlink channel to a particular antenna beam within a communications satellite payload.

M-port MPAs are combined with M-port OMUX filters, where typically M=4 or 8 but not necessarily so.

M-port MPAs are connected to N-port OMUX filters with M<N and comprising a high power selectivity switch network between the MPA outputs and OMUX inputs to route the M outputs to M of N inputs for enhanced flexibility.

M-port MPAs are connected to N-port OMUX filters with M>N with (M−N) MPA outputs unused and carrying no useful signals (with the corresponding MPA inputs unused).

A contiguous downlink band is supported by means of non-contiguous and non-overlapping "odd" and "even" OMUX filters.

The odd and even outputs from the OMUX filters are combined into a single beam by means of two single-feed-per-beam antenna systems.

The odd and even outputs from the OMUX filters are combined into a single beam by means of a single dual-feed antenna system for any given downlink coverage.

Operation of the M outputs of any given MPA within M non-overlapping frequency ranges (non-overlapping OMUX filter passbands) as a means to reduce unwanted emissions via each antenna port (feed), where the antenna-port-to-antenna-port isolation is the combination of the MPA port-to-port isolation and the OMUX filter out-of-band rejection.

Operation of the M outputs of any given MPA within M non-overlapping frequency ranges (non-overlapping OMUX filter passbands) as a means to reduce the MPA port-to-port isolation requirement and thereby ease MPA implementation.

Operation of each MPA over only part (e.g. 1 GHz) of a wide contiguous downlink frequency range (e.g. 2 GHz), thereby reducing the MPA bandwidth requirement and easing MPA implementation.

The invention claimed is:

1. Apparatus for selectively directing downlink channels to downlink beams of a communications satellite, including:
   at least one multiport amplifier, the or each multiport amplifier comprising a plurality of microwave power amplifier units, a plurality of input ports and a plurality of output ports, the input ports and the output ports being connected to said amplifier units by signal dividing networks, so that an input signal at any input port is amplified by all amplifier units, and then recombined into an output signal at an output port,
   at least one output multiplexer, the or each output multiplexer comprising a plurality of input ports coupled via transmission lines to an output port, and each input port being coupled to the output port via a respective band pass filter, each said band pass filter having a predetermined pass bandwidth with guard bands between the pass band and adjacent pass bands of the output multiplexer,
   and the input ports of said one output multiplexer being selectively coupled to the output ports of said one multiport amplifier wherein said guard bands are dimensioned to be a predetermined width in frequency so as to compensate at least partially for cross-talk characteristics of said one multiport amplifier.

2. Apparatus according to claim 1, including at least first and second output multiplexers as defined herein, wherein each output multiplexer has a plurality of inputs, each input having a respective signal bandwidth, with predetermined guard bands between adjacent signal bandwidths, and wherein the signal bandwidths of said output multiplexers are interleaved so that each of at least some of the inputs of said first output multiplexer is located wholly or mainly within a guardband of said second output multiplexer, and each of the signal bandwidths of at least some of the inputs of said second output multiplexer is located wholly or mainly within a guardband of said first output multiplexer;
and the outputs of said one multiport amplifier are selectively connected to inputs of said first and second output multiplexers so that the isolation characteristics provided by said guardbands compensates at least partially for the cross talk characteristics of the output ports of said one multiport amplifier.

3. Apparatus according to claim 2, wherein a first output of said one multiport amplifier is connected to said first output multiplexer, and a second output of said one multiport amplifier, which is adjacent in frequency to said first output, is connected to said second output multiplexer.

4. Apparatus according to claim 2, wherein said downlink channels have a spectrum bandwidth, and including at least first and second output multiplexers as defined herein, wherein each output multiplexer has a bandwidth covering said spectrum bandwidth, and including at least first and second multiport amplifiers as defined herein, said first multiport amplifier having a bandwidth covering a first part of said spectrum bandwidth, and said second multiport amplifier having a bandwidth covering a second part of said spectrum bandwidth.

5. Apparatus according to claim 2, wherein said first output multiplexer is connected to a first antenna element of a multi-element antenna, and said second output multiplexer is connected to a second antenna element of a multi-element antenna, said first and second elements being arranged to provide a single spot beam.

6. Apparatus according to claim 1, wherein each multiport amplifier has the same number of input ports and output ports (M), and each output multiplexer has said same number (M) of input ports, preferably where M=4 or 8.

7. Apparatus according to claim 1, wherein each multiport amplifier has the same number of input ports and output ports (M), and each output multiplexer has a larger number (N) of input ports, and further including a high power selectivity switch network between the MPA outputs and output multiplexer inputs to route the M outputs to M of N inputs for enhanced flexibility.

8. Apparatus according to claim 1, wherein each multiport amplifier has the same number of input ports and output ports (M), and each output multiplexer has a smaller number(N) of input ports, with (M−N) MPA outputs unused and carrying no useful signals.

9. Apparatus according to claim 1, wherein each output multiplexer is connected to a respective antenna element of a multi-element antenna for forming a respective single spot beam.

10. Apparatus according to claim 1, wherein the width of a said guard band is at least 50% of that of an adjacent passband.

11. A method of selectively directing downlink channels to downlink beams of a communications satellite, including:
   providing at least one multiport amplifier, the or each multiport amplifier comprising a plurality of microwave power amplifier units, a plurality of input ports and a plurality of output ports, the input ports and the output ports being connected to said amplifier units by signal dividing networks, so that an input signal at any input port is amplified by all amplifier units, and then recombined into an output signal at an output port,
   providing at least one output multiplexer, the or each output multiplexer comprising a plurality of input ports coupled via transmission lines to an output port, and each input port being coupled to the output port via a respective band pass filter, each said band pass filter having a predetermined pass bandwidth with guard bands between the pass band and adjacent pass bands of the output multiplexer, wherein the downlink channels comprise a plurality of frequency channels spaced across the downlink signal bandwidth, and selectively directing the frequency channels to input ports of said one multiport amplifier, and selectively coupling the output ports of said one multiport amplifier to the input ports of said one output multiplexer, wherein said guard bands are dimensioned to be of a predetermined width in frequency so as to compensate at least partially for cross-talk characteristics of said one multiport amplifier.

12. A method according to claim 11, wherein at least first and second output multiplexers as defined herein are provided, wherein each output multiplexer has a bandwidth covering said downlink signal bandwidth, and wherein the pass bandwidths of said output multiplexers are interleaved so that each of at least some of the inputs of said first output multiplexer is located wholly or mainly within a guardband of said second output multiplexer, and each of the signal bandwidths of at least some of the inputs of said second output multiplexer is located wholly or mainly within a guardband of said first output multiplexer, and the method including connecting a first output of said one multiport amplifier to said first output multiplexer, and connecting a second output of said one multiport amplifier, which is adjacent in frequency to said first output, to said second output multiplexer.

13. A method according to claim 11 or 12, including providing at least first and second multiport amplifiers as defined herein, said first multiport amplifier having a bandwidth covering a first part of said signal bandwidth, and said second multiport amplifier having a bandwidth covering a second part of said signal bandwidth.

14. A method according to claim 12, wherein said first output multiplexer is connected to a first antenna element of a multi-element antenna, and said second output multiplexer is connected to a second antenna element of a multi-element antenna, said first and second elements providing a single spot beam.

15. A method according to claim 11, wherein each output multiplexer is connected to a respective antenna element of a multi-element antenna to form a respective single feed spot beam.

16. A method according to claim 11, wherein the width of a said guard band is at least 50% of that of an adjacent passband.

* * * * *